April 23, 1946.　　　　H. I. LEA　　　　2,398,836
DISTILLATION SYSTEM
Filed Feb. 13, 1943　　　3 Sheets-Sheet 1

Inventor
Henry I. Lea

April 23, 1946.  H. I. LEA  2,398,836
DISTILLATION SYSTEM
Filed Feb. 13, 1943  3 Sheets-Sheet 2
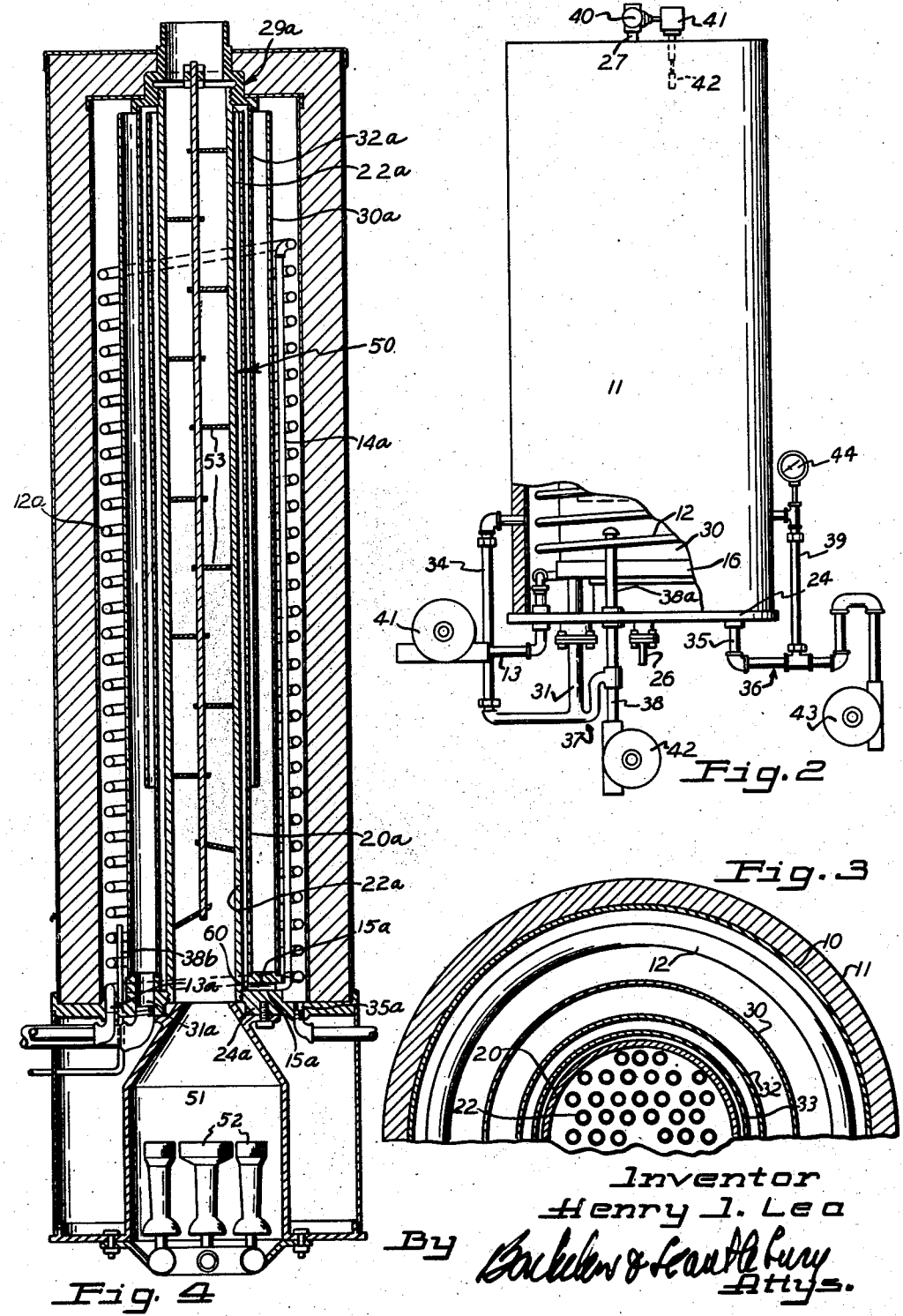

April 23, 1946. H. I. LEA 2,398,836
DISTILLATION SYSTEM
Filed Feb. 13, 1943 3 Sheets-Sheet 3
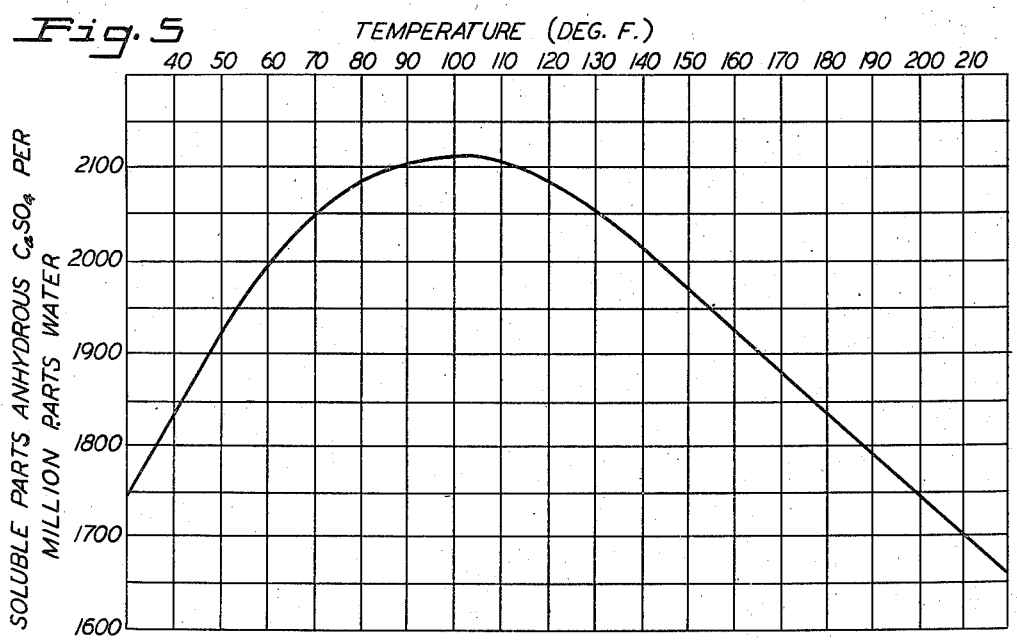
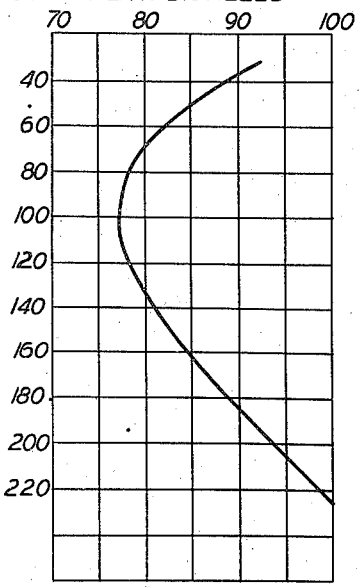
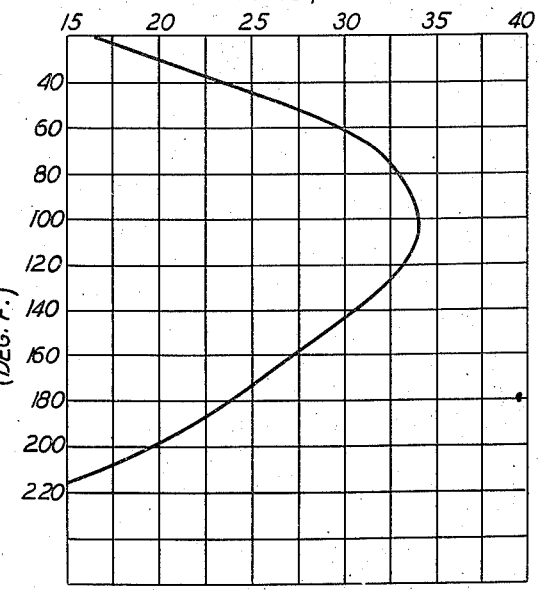
Inventor
Henry I. Lea
By
Attys.

Patented Apr. 23, 1946

2,398,836

UNITED STATES PATENT OFFICE 2,398,836

DISTILLATION SYSTEM

Henry I. Lea, Santa Monica, Calif.; Grace Joel Lea administratrix of said Henry I. Lea, deceased Application February 13, 1943, Serial No. 475,785

14 Claims. (Cl. 202—187)

The general type of system and apparatus for fluid heating and distillation to which this present invention relates is shown in several particular and illustrative forms in my previous patents, No. 1,845,159, Feb. 16, 1932; 1,889,254, November 29, 1932; 1,971,492, August 28, 1934; 1,990,831, February 12, 1935. The unitary distillation apparatus of those patents is characterized generally by an arrangement of an evaporator within a vapor space or chamber which in turn is within a condenser through which the cool raw fluid is introduced. The general arrangement promotes a high thermal operating efficiency by retaining and recycling within the system a large proportion of the heat required for vaporization. And with the relatively cool condenser at the outside, the heat losses by radiation and conduction are small.

The present invention has as its objectives several improvements in both the apparatus and method of that type of distillation or fluid heating system, all of which will be made most clear in the following detailed descriptions of preferred structures and operations. I may however mention preliminarily that, although my former specific embodiments and designs, built and tested, have attained high thermal efficiency and were capable of long operating life, the structures have been relatively expensive to manufacture. One of the purposes of the present improvements is to provide a form of unitary apparatus which is simple and of low cost and still at the same time is capable of maintaining the desired high efficiency through a long operating life.

Although my present heating and distilling system is capable of many diverse uses it has been particularly designed for a certain type of use which I will explain. Generally speaking, the system and apparatus may be used for heating or distilling any type of liquid, for various purposes, and operated under a wide range of temperatures and pressures precisely maintained. The apparatus may be used as a simple liquid heater, or it may be used for the liberation of entrained or dissolved gases from liquid, such as the liberation of ammonia gas from its liquor or sulphurous gases from water. It may be used either to distill all or a fraction of its feed liquid, under any properly chosen conditions of temperature and pressure. However, one of its most useful functions is the distillation at high thermal efficiency of a fraction of the feed liquid, and at temperatures and pressures (which may be sub-atmospheric) which do not either deteriorate a liquid such as milk which must be handled at relatively low temperatures, or which do not induce the precipitation of dissolved solids, such as scale forming solids.

Distillation of sea water is illustrative. Sea water carries in solution some portion of everything that is soluble in water; it holds each of these substances within a specific temperature range; it loses them all on freezing; with rising temperature, to a definite point the solubility for each of them increases, then decreases, following a reversed solubility curve. Depending on the pressure to which it is exposed, water can be evaporated at temperatures as low as freezing; therefore it is possible to evaporate water at temperatures below those at which it begins to lose its ability to hold in solution those lime and magnesia compounds from which practically all scale problems arise. It is possible to evaporate a considerable percentage of sea water while leaving in the brine, still in solution and ready to be carried off with the brine as waste, all of the scale-forming matter of the original volume of sea water.

The distillation system of my present invention is capable of distilling such liquors as sea water in the manner just indicated, maintaining high thermal efficiency in a simple inexpensive apparatus. The following detailed description of illustrative preferred forms of apparatus, and its illustrative application to such liquids as sea water, will make the invention clear.

In the accompanying drawings:

Fig. 2 is an elevational diagram of the still, with parts broken away in section, and illustrating the circulation system;

Fig. 3 is a fragmentary cross section on line 3—3 of Fig. 1;

Fig. 4 is a vertical central section of an illustrative variant form of still apparatus; and Figs. 5, 6 and 7 are diagrams illustrative of my method of distillation.

Figure 1:
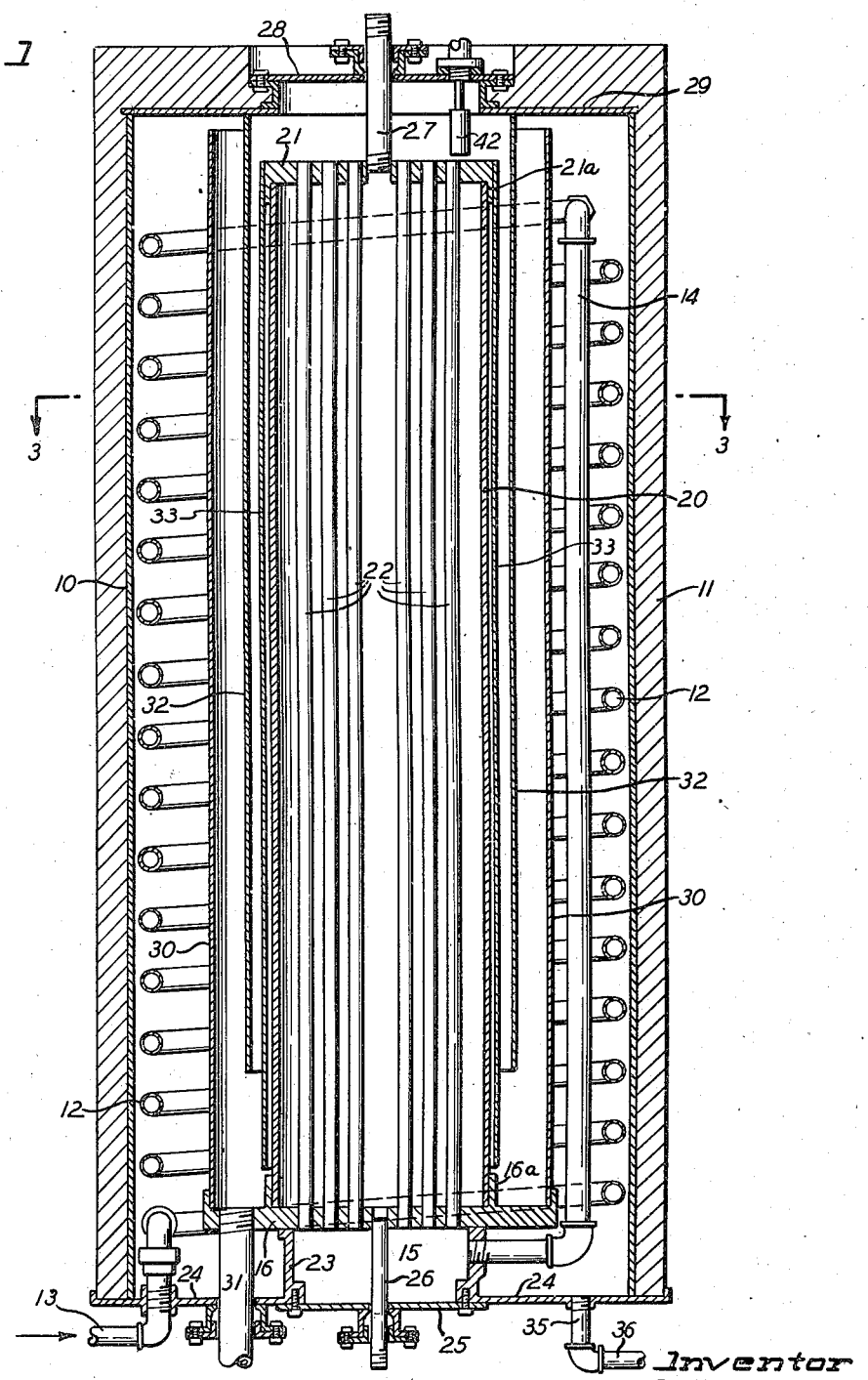
Fig. 1 is a central vertical section of one illustrative preferred form of still apparatus.

Referring first to Figs. 1 and 3 the still apparatus is illustrated as being enclosed within an outer shell 10, which may be exteriorly heat insulated as at 11, if desirable. Inside shell 10, and preferably located close to the shell wall, is a condenser 12 preferably in the form of a spiral tube connected at its lower end to the raw liquid intake 13, and connected at its upper end to a vertically extending tube 14 which conveys the then heated raw liquid into a head chamber 15 which is located at the lower end of the apparatus immediately beneath the tube sheet 16 of the vaporizer.

The particular form of condenser here shown is preferred, but illustratively typical. Any other form may be used which is suitable for arrangement in an annular space close to or in association with the external shell 10. The first mentioned one of my previous patents shows other typical forms which may be used.

Figs. 1 and 3 show a vaporizing heater designed to receive its heat input from steam or other hot vapor or liquid, although, as will appear, other sources of heat may be utilized as well. I may remark that the apparatus shown in Figs. 1 and 3 has been designed in its specific dimensions and proportions particularly for distillation of sea water using steam as the source of heat; designed particularly with a view to use on shipboard. As shown in these figures the central evaporator or heater comprises an exterior shell 20 with lower tube sheet 16 and upper tube sheet 21 closing the ends of the shell, and with internal tubes 22 in which the liquid is vaporized. The lower ends of tubes 22 communicate with head chamber 15 which is formed within a cylindric shell 23 projecting up from the bottom plate 24 which closes the lower end of the large exterior shell 10. Member 23 and end plate 24 may be formed in any suitable manner; but may economically be formed of sheet or plate or cast metal, integrally, or welded together, and plate 24 may be welded to the lower edge of shell 10. The lower end of head chamber 15 is closed by removable plate 25, through which projects a pipe 26 which leads from the lower end of the evaporator for carrying off the cooled or condensed heating fluid. The heating fluid, steam in this case, enters the upper end of the evaporator through pipe 27 which leads through a removable cover plate 28 mounted on the upper closure plate 29 which closes the upper end of shell 10. Closure plate 29 may also be welded to shell 10.

Lower tube sheet 16 is shown as of larger diameter than the evaporator shell 20, extending annularly outside the diameter of the lower end of the evaporator to form a support for an upwardly cylindric baffle 30 whose upper edge is located closely under the upper closure plate 29. The extended tube sheet 16 thus also forms the bottom for an annular chamber which is enclosed within baffle 30. From this annular chamber the unvaporized residue liquid is removed through discharge pipe 31 which projects down through lower closure plate 24.

A second baffle 32, inside of baffle 30 and spaced from that baffle and from evaporator shell 20, depends from upper closure plate 29 and has its lower edge located at a substantial distance above tube sheet 16, that location being for a purpose which will appear.

For certain purposes, which will appear, an insulating shell 33 may be hung from flange 21a of upper tube sheet 21, spaced from but closely surrounding evaporator shell 20, and with its lower edge close to but slightly spaced from from flange 16a of lower tube sheet 16.

A distillate discharge pipe 35 leads from the lower end of the annular condensing chamber formed between outer shell 10 and outer baffle 30. This discharge pipe is fitted into lower closure plate 24, conveniently in such a relative position as shown in Fig. 1, and leads through a trap 36. The residue discharge pipe 31 also preferably leads through a trap 37, as shown diagrammatically in Fig. 2. Trap 37 communicates at its outlet end with a pipe 38 which forms the final discharge pipe for the residue and which has an upward extension 38a which projects through bottom closure plate 24 into the annular condensation chamber which is formed between outer shell 10 and outer baffle 30. The upper open end of pipe 38a is hooded to prevent entrance of falling liquid and projects to a level safely above the depth of distillate which may stand above the bottom of the shell.

As indicated diagrammatically in Fig. 2, the live steam feed pipe 27 may be equipped with a control valve 40 which may be automatically controlled, through the medium of the mechanism diagrammatically indicated at 41, by a thermometer bulb 42 which is hung from upper closure plate 28 in a position just above the upper end of the evaporator, where the instrument will be responsive to the temperature of the vapors issuing from the evaporator tubes.

As has been indicated, for certain purposes such as the distillation of sea water it is desirable to operate the apparatus under sub-atmospheric pressures. Systems for so operating a still are of course well known in the art, and any suitable system for low pressure operation may be adopted. By way of illustration for the purpose I show in Fig. 2 a positive feed pump 41 connected with feed pipe 13; and positive vacuum pumps 42 and 43 connected respectively to residue outlet 38 and distillate outlet trap 36. These pumps may be of any positive type, such as a rotary blade type, and driven by any suitable controllable means. The pressures at which the still is operated may be set and maintained by setting and maintaining the effective evaporating temperature of the heater and the relative rates of raw liquid input and residue and distillate withdrawal; and, if desired those rates of input and withdrawal may be automatically regulated and controlled by automatic regulation and control of the volumetric speeds of operation of the several pumps. Means for so setting and regulating the speed of pumps are well known in the art and need not be illustrated here.

Gauge glasses 34 and 39 may be used to indicate, respectively, the levels of the residue brine and of the distillate. Because of equalized pressures in the apparatus these glasses will show true levels. For convenience of observation they may be located close together; they are shown in the diagram of Fig. 2 at opposite sides of the unit merely for convenience of illustration. By adjusting the speeds of the two vacuum pumps, with the raw water feed pump delivering raw liquid at a fixed rate, and with temperature conditions within the unit stabilized, fixed levels in the two gauge glasses can be maintained and correct operation of the unit assured. Automatic level controls of known types may be applied to the gauge glasses if desired. A vacuum gauge, as indicated at 44, may be used; and automatic controls of known types may be actuated by the gauge to maintain the desired operating pressure.

Any materials suitable may be utilized in the still structure, but materials of certain types are preferable. The vaporizing tubes 22 are best made of a material such as Admirality metal, and the tube sheets of Muntz metal. The outer shell of the heater may be of gun metal, and the baffles 30 and 32, the shielding tube 33, and the condenser coil, of tinned copper. The top and bottom plates, the distributing chamber 15, and the other tubes and pipes within the structure, and the stuffing boxes, may best be made of gun metal. It is preferred, as far as is practicable, to secure and connect all of the various elements by welding, brazing, or the like.

Typical operation of the apparatus which has now been described, may be as follows. Live steam for the boiler, or exhaust steam, automatically controlled as to volume, pressure and temperature, is introduced through pipe 27 to the interior of evaporator shell 20. When live steam is being used, the cooled steam and condensate passing out through discharge pipe 26 may flow into a direct return trap and so be forced back, automatically into the boiler feed line. Operating in that manner no water is lost from the boiler feed supply, and the boilers are called upon only to provide the latent heat given up by the live steam while passing through the still.

The raw sea water enters the lower end of condenser coil 12, controlled as to volume and pressure by the operation of pump 41. That water travels spirally upwardly to the upper end of cond nser coil 12 and then down through tube 14 to enter the distributing head chamber 15 and the lower ends of evaporator tubes 22. Passing up through evaporator tubes 22, the water is heated from the steam surrounding the tubes in the evaporator, until the temperature of the water and of the generated vapor reaches the desired point, which is controlled by the automatic temperature control described. This temperature is fixed and maintained preferably just below the temperature at which the residue water begins to lose its capacity for holding in solution those solids which would otherwise precipitate and form scale. Rapid evaporation of the water at that relatively low temperature is facilitated by maintaining a partial vacuum by means of operation of the discharge pumps.

Having reached the top of the evaporating heater, the mixed water and vapor, together with occluded or dissolved gases which have been freed, overflows the top of the evaporator and flows down through the annular space around the evaporator and inside inner baffle 32. At the lower end of baffle 32 where the stream of fluids reverses its direction of flow to flow upwardly outside of baffle 32, a separation occurs. The annular space between baffle 32 and heater shell 20 (or the insulating shell 33) is made narrower than the annular space between inner baffle 32 and outer baffle 30. The velocity of downward flow of mixed liquid and gaseous fluids to the lower edge of inner baffle 32 is consequently comparatively high. Upon reaching that lower edge, the unvaporized residue water, carrying all of the dissolved solids and at least a part of the entrained and dissolved gases, tends to flow on downwardly, due to its weight and mass, and is projected onto bottom tube sheet 16 at the lower end of the annular space between evaporator shell 20 and outer baffle 30.

The water vapor, still uncondensed, together with some of the entrained gases, then flows comparatively slowly upwardly through the larger annular space between inner baffle 32 and outer baffle 30. This slow upward flow has no great tendency to carry entrained liquid particles along with it; and any such entrained unvaporized liquid has the opportunity of flowing back down through the annular space to join the accumulation of residue liquid which flows out through residue pipe 31. Thus, nothing but comparatively dry vapor and some fixed gases reach the top of outer baffle 30 to flow over the upper edge into the upper end of the annular condensation passage between outer baffle 30 and outer shell 10.

Flowing down through the annular condensing passage, the vapors give up their heat to the initial raw water which is being introduced through condenser coil 12, and are completely condensed. The condensation is then drawn off through outlet trap 36 through pump 43 which is operated to draw off the condensate and maintain the desired low pressure. Whether or not a body of condensate liquid is maintained to some depth in the bottom of the apparatus, above lower plate 34, depends upon the conditions at which operating equilibrium of the system is attained.

In normal continued operation of the system the amount of raw water introduced in unit time is always sufficient to take up all of the latent heat of vaporization of that fraction of the liquid which has been evaporated. The vapors are completely condensed before reaching the lower end of the condensing passage. Consequently, in the lower part of the annular condensing passage there can only be present the condensate and the air or other gas which has been released from entrainment or solution and which has reached the outer condensing zone. I provide the stand pipe 38a for the purpose of removing such fixed gases from the system and preventing their accumulation, the open upper end of this standpipe being somewhat above lower plate 24, as previously stated. Standpipe 38a communicates directly with the residue outlet pipe 38 which leads to vacuum pump 42. Vacuum pump 42 thus takes both air through standpipe 38a and the residue liquid through trap 37, and is operated at such volumetric speed as will maintain the desired low pressure in the system. A certain portion of the released fixed gases may be drawn out through trap 37 along with the residue liquid. All of such released gases would be so drawn out if the special gas pipe 38a were not used so long as a body of residue liquid does not stand over lower closure plate 24. The provision of the special standpipe 38a insures withdrawal of the gases, and prevention of their accumulation, if a body of residue liquid stands over the lower plate in normal equilibrium conditions of operation.

The purpose of shielding tube 33, around the evaporator shell 20, is to prevent local overheating of the unvaporized water passing down over the evaporator shell. It will be understood that as the water flows downwardly over the evaporator shell and inside the inner baffle tube 32, it continues to be heated and, at least to some extent, vaporized by heat from the steam in the evaporator. The major evaporation has previously taken place while the water has passed up through the evaporator tubes 22. The exterior surface of evaporator shell 20 is so large that, at ordinary velocities of flow through the apparatus, the flow over the outer surface of the heater shell may be more or less irregular and without assurance of maintaining a continuous film of water over the whole of the shell surface. And in installations where the still cannot be maintained in vertical position, as on shipboard, the maintenance of a continuous unbroken film of liquid over the shell is substantially impossible.

With live steam at about 240° or so inside the shell, and with areas of the shell alternately flooded and dry, scale formation on the shell surface is almost a certainty. The thin copper shielding tube 33 has the function of enclosing a substantially dead air space immediately adjacent evaporator shell 20 to act as an insulator or partial insulator between shell 20 and the surface over which the liquid flows downwardly around the evaporator. This insulation, or partial insulation, slows down the flow of heat from the evaporator shell to the surface over which the water flows, and thus prevents the formation of scale. The shielding tube 33 is preferably not structurally joined at its lower end to the lower tube sheet 16, but hangs suspended from its upper end, to avoid stresses and distortions due to differential expansions and contractions.

Although I may prefer to provide such a shielding tube, any suitable insulating jacket or layer around the evaporator shell will suffice. For instance, a uniform layer of scale deposited upon the shell will perform the same function; and that layer of scale may be provided by simply operating the still without a shielding tube 33 until a uniform layer of scale has been deposited over the whole shell surface to a thickness which provides a sufficient retardation of heat flow to prevent any further localized overheating of the liquid.

With any such insulation for the evaporator shell, the downwardly flowing volume of liquid still receives some heat from the live steam in the evaporator; but the major portion of the vaporizing heat is transferred to the liquid while it is passing at relatively high velocity, and turbulently, through the relatively small evaporating tubes 22 where the rate of heat transfer is highest.

Although the system is capable of being used under wide variations of operating conditions, a statement of one set of conditions will be illustrative of the operative efficiency of the system as applied, for instance, specifically to sea water. As a basis for this description, I may state that Figs. 1 and 3 of the drawings are to scale, and that the apparatus has been designed to produce around one U. S. gallon of pure distilled water per minute from sea water, when the apparatus is of such size that the diameter of outer shell 10 (to fix the scale) is approximately 25 inches. For full capacity production at highest thermal efficiency an apparatus of that size requires the heat which is supplied by live steam delivered to the unit under a pressure of 10 lbs. per sq. in. and equivalent temperature of 240° F., and at the rate of 11.3 lbs. weight of steam per minute. The volume of live steam needed, and also of the raw water input, are dependent of course upon the percentage of the raw water which it is desired to evaporate. The unit has a wide range of heating or distilling capacity, depending on the ratio of heat input to raw water supply, and upon the temperature of operation; it can act merely as a heater of raw water, or it can distill off any desired percentage of raw water, up to the point at which the resulting brine becomes saturated. It can of course distill off a still higher percentage even though there be an accompanying precipitation. But the optimum conditions of operation are those which result in the highest thermal efficiency, and using evaporation temperatures which are around the temperature of maximum solubility of the solutes in the water.

The highest thermal efficiency is reached when the volume of the incoming raw water is such that its heat capacity in rising from its normal temperature to vaporizing temperature (at the corresponding operating pressure) is just sufficient to take up the latent heat of vaporization of the fraction of water which has been vaporized and the available sensible heat of its condensate. For instance, with raw water at around 60° F., and operating at normal pressure and temperature of evaporation, the condition of highest thermal efficiency allows the evaporation of one pound of water out of each 7.14 pounds, or about 14%, of raw water introduced. This evaporation fraction varies of course for different liquids, and varies with the initial liquid temperature, and also with different evaporating temperatures; but the fraction just stated can be taken as typical for water. Operating at this condition of highest thermal efficiency, a liquid may be run through the operation of fractional evaporation either once or successively a number of times, either through the same distillation unit or through a plurality of multi-stage units, until the solids in the residue solution approach or reach the saturation point.

The optimum temperature at which the evaporation is carried on (governed by the controlled pressure at which evaporation takes place) can be best understood from the diagrams of Figs. 5, 6 and 7 and the following explanation, again using the distillation of sea water as a typical example.

In analysis, ordinary sea water is nearly uniform throughout the world; its total salts range from about 3.7% in tropical regions to about 3.5% in frigid regions. A typical analysis of sea water (this taken from the English channel) is as follows:

|  | Per cent by weight |
|---|---|
| Sodium chloride (NaCl) | 2.806 |
| Magnesium chloride ($MgCl_2$) | .366 |
| Potassium chloride (KCl) | .076 |
| Magnesium sulphate ($MgSO_4$) | .23 |
| Calcium sulphate ($CaSO_4$) | .14 |
| Calcium carbonate ($CaCO_3$) | .003 |
| Calcium bromide (CaBr) | .003 |
|  | 3.624 |
| Traces of a great many other salts | .003 |
|  | 3.627 |
| Ordinary water | 96.373 |
| Sea water | 100.000 |

The above analysis shows relative weights of these salts in sea water to be as follows:

|  | Per cent |
|---|---|
| Sodium chloride | 77.362 |
| Magnesium chloride | 10.090 |
| Potassium chloride | 2.096 |
| Magnesium sulphate | 6.342 |
| Calcium sulphate | 3.861 |
| Calcium carbonate | .083 |
| Calcium bromide | .083 |
| Misc. other salts | .083 |
|  | 100.000 |

Salts such as sodium chloride have such a large solubility in water, and increasing solubilities with increasing temperatures, so that it is impossible to precipitate them at any temperature which is here contemplated unless the fraction distilled is carried far beyond any fraction which I contemplate. For instance, approximately 90% of sea water can be distilled off before the residue brine is saturated with sodium chloride. Generally speaking all sea water salts which show a consistent rise in solubility with increase in temperature within the temperature ranges contemplated here may be dismissed from further consideration.

The problem is with the scale forming group, all of which are believed to show reversed solubility characteristics-increasing solubility with increase of temperature up to a given point, and then decreasing solubility with further temperature increase. Calcium sulphate (gypsum) is typical of the scale forming group; its solubility characteristics are shown in the diagram of Fig. 5. Of the main scale forming substances, the carbonates and sulphates of magnesium and calcium, only the sulphate of calcium is present in sea water in a concentration at all approaching saturation. If sea water can be distilled without precipitation of that sulphate, no precipitation of any substance occurs.

The curve of Fig. 5 shows the reversed solubility characteristics of calcium sulphate. Highest solubility lies at about 104° F. where about 2110 parts per million are soluble. At 212° F. only about 1700 parts are soluble; at 155° F. for instance, and also at 55° F., approximately 1950 parts are soluble; and at 143° F. and 62° F., approximately 2000 parts.

As shown by the first table above, sea water carries 1400 parts per million of calcium sulphate. For the moment disregarding temperatures and solubilities, the effect of removing various percentages of water and leaving the sulphate in the residue brine is shown in the following table.

| Percent of sea water evaporated | Grams of calcium sulphate per million grams of the remaining brine |
|---|---|
| 0.0 | 1400 |
| 2.5 | 1435 |
| 5.0 | 1473 |
| 7.5 | 1513 |
| 10.0 | 1555 |
| 12.5 | 1600 |
| 15.0 | 1647 |
| 17.5 | 1696 |
| 20.0 | 1750 |
| 22.5 | 1806 |
| 25.0 | 1866 |
| 27.5 | 1931 |
| 30.0 | 2000 |
| 32.5 | 2074 |
| 35.0 | 2153 |
| 37.5 | 2240 |

If 14% of sea water is evaporated, there are 1628 parts of the sulphate per million left in the residue brine.

Since solubility of the sulphate varies with temperature, the percentage of raw water that can be evaporated before the brine becomes a saturated solution also varies. The curve in the diagram of Fig. 6 shows the limiting percentages at different temperatures. The curve shows that at 212° F., only 17½% can be evaporated; but at 155° F., or at 55° F., approximately 28% can be removed; while at 104° F., approximately 33½% can be removed. If 14% is to be removed, the margin of safety throughout the range from 55° to 155° F. is approximately 14% or more; but at temperatures between 155° and 212° F. the margin falls with increasing temperature until it is only 3½ at the latter temperature. At somewhat higher temperature the brine would be saturated.

The curve in Fig. 7 shows the percentage of saturation of the brine at the same range of temperatures when 14% of the original raw water is evaporated. When 14% is removed there are 1628 parts per million of the sulphate in the residue brine. Dividing that figure by the known solubilities at the various temperatures, we arrive at the curve of Fig. 7. At 212° F. the brine is 96% saturated; at 155° and 55° F. substantially 87% saturated; and less saturated in the range between those last named temperatures, with a minimum saturation of 77% at 104° F. The margin of safety at 212° is 4%, and is 13% or more in the range between 55° and 155° F. At a temperature somewhat higher than 212° F. the margin disappears.

It thus appears that, to operate under optimum conditions of thermal efficiency (assumed here to involve evaporation of 14%) and at the same time to avoid possibility of scale deposit one at least must operate in the temperature range in which the residue brine does not become supersaturated. For calcium sulphate in sea water, that range runs up to approximately 228° F. To allow for local overheating, the temperature range should allow a margin of safety, such as is allowed in the range from approximately 55° to 155° F. or thereabouts. Within such a range of safe margin I choose preferably to operate at or near the higher limit, say around 155° F., as the productive capacity of a given sized unit is apparently greater at a higher than at a lower temperature.

Thus, the choice of evaporating temperature may be expressed in several different manners. That temperature may be at any point in the range in which the residue does not become supersaturated; preferably within a more limited range within which the brine lacks saturation by a safe margin; and preferably at or near the upper end of that range—or, expressed otherwise, at a temperature just under (by an accepted safety margin) the upper temperature at which the brine becomes saturated.

I have said that any suitable source of heat may be utilized. Generally speaking, the central heater or evaporator may be designed to utilize any of the commonly known sources of heat, such as hot combustion gases, or electrical resistance. In Fig. 4 I show a modified form of structure in which a central heater indicated generally by the numeral 50 may represent a heater of any type, for instance one intended to be heated by combustion of fuel gas. In this modification the heater 50 is shown as including or as being immediately surrounded by a heated tubular wall 22a which, in effect becomes the member which presents the primary surface at which the raw water is first heated and vaporized and at which the majority of the vaporization takes place. A combustion chamber 51 and burners 52 are shown, and a baffle system 53 inside the tube 22a is designed to create a turbulence of flow of the hot combustion gases to cause maximum heat transfer to wall 22a. In this modified form the raw water enters at 13a into the lower end of condenser coil 12a, leaving the upper end of the condenser coil through the tube 14a which carries the then heated water to the port or passage 15a which communicates with the lower end of the annular space between heater wall 22a and an upstanding tubular shell 20a which is mounted at its lower end in the lower plate structure 24a. The upper end of tube 20a lies at a point closely spaced under the upper end plate structure 29a. The raw liquid rises in the annular space between 22a and 20a and is mainly vaporized during its upward passage through that relatively thin annular space. Reaching the top of tube 20a it overflows and passes down over the surface of tube 20a and down through the annular space between that tube and the suspended baffle tube 32a, which corresponds to baffle tube 32 in the structure first described. The mixed fluids then flow downwardly in the annular space between 20a and 32a until the lower edge of 32a is reached, when the unvaporized liquid, and the air to some extent, are separated out, to be removed in the same manner as described in connection with Figs. 1, 2 and 3, or to be removed at the residue outlet 31a. The vapors, and the remainder of the air then pass upwardly between baffle tube 32a and the upstanding baffle tube 30a, and over the upper edge of 30a into the annular condensing passage in which condensing coil 12a is located. The condensate is removed at 35a; and the fixed gases may be removed at the standpipe 38b, in the manner before described.

It will be noted that in both of the apparatus forms which I have described, the mixed fluids after leaving the evaporator move through a downward passage, inside the dependent baffle 32 or 32a, and then have their flow direction reversed to pass up, inside the upstanding baffle tube 30 or 30a, to finally flow downwardly through the surrounding condenser zone and over the condenser coils. This same path of flow, which greatly facilitates the separation of the residue liquid and the fixed gases, is maintained in both forms of heater, although in one of these forms the initial passage of the liquid in heat transfer contact with the heater is in an upward direction through tubes inside the heater, and in the other form is in an upward direction around a tubular wall which is in effect the immediate heater shell. In the form shown in Fig. 1, after its initial upward pass, the fluid then flows downwardly over the immediate external shell of the heating evaporator, or over an insulating layer surrounding that shell. In the form of Fig. 4, the first downward pass of the fluid is outside the upstanding tube 20a within which the fluid first flows upwardly. Tube 20a is thus somewhat similar to the outer shell 20 of the heating evaporator in Fig. 1, particularly as some portion of the liquid may be vaporized in flowing down around it; but tube 20a needs no external insulating layer, as all of the heat which reaches it is transferred through the fluid within it. The annular body of fluid between 22a and 20a thus becomes in effect the insulating layer for tubular shell 20a over which the fluid passes downwardly. And tubular wall 22a needs no special insulating layer, as the fluids rise and flow upwardly around it very turbulently in a more or less solid body which virtually precludes the deposition of scale. At the point where the heated raw water enters the space at the bottom of tubular shell 22a a small baffle or vane, indicated at 60, may be installed for the purpose of throwing the entering stream into tangential motion, so that the movement of the fluids upwardly through the annular space around 22a is at relatively high velocity, swirling and turbulent. This increases the rate of heat transfer and also the uniformity of heat transfer.

The form of apparatus shown in Fig. 4 may be operated under controlled conditions of temperature, pressure and volumetric flow, the same as has been described for the forms of apparatus of Fig. 1. Either form may be operated for multistage evaporation with two or more units in series. Operating in the manner which I have described, both forms of the apparatus have a very high thermal efficiency. The gross heat requirement per pound of distilled water is only 1318 B. t. u. In fact the efficiency is so high that, with heat supplied from compressed butane or propane, it is practicable to use my distillation unit in convenient size to provide ample water for life boats. The compactness and simplicity of the unit is also an important factor in any such use, and its construction makes possible its continued operation even while being tossed about with the boat.

I claim:

1. In distillation apparatus of the type which includes a central vertically extending evaporation heater, a condenser spacedly surrounding the heater, and structure including passages for introducing raw cool liquid to the condenser, for passing the condenser liquid to the evaporation heater and for passing vapors from the heater into condensing contact with the condenser, together with outlets for withdrawing condensed distillate and unvaporized residue; the improvement which is characterized by structure forming a passage extending first downwardly from the top of the central evaporation heater and thence through a reverse turn upwardly to the condenser, the outlet for unvaporized residue communicating with said passage at its lowermost point at its reverse turn.

2. Distillation apparatus as defined in claim 1, and in which the downwardly extending passage leading to the reverse turn is of smaller cross-sectional area than the upwardly extending passage leading from the reverse turn, so that the velocity of fluid flow into the reverse turn is relatively high as compared with the flow away from that turn.

3. Distillation apparatus as defined in claim 1, and in which the passage forming structure comprises a depending baffle tube spacedly surrounding the evaporation heater and having a free lower edge, a member forming an annular passage bottom surrounding the heater and spaced below the lower edge of said baffle tube and from which bottom the residue outlet leads, and another baffle tube spacedly surrounding the first mentioned baffle tube, extending upwardly from said bottom member and having a free upper edge over which vapors may flow to the condenser.

4. Distillation apparatus as defined in claim 1, and in which the passage forming structure comprises a depending baffle tube spacedly surrounding the evaporation heater and having a free lower edge, a member forming an annular passage bottom surrounding the heater and spaced below the lower edge of said baffle tube and from which bottom the residue outlet leads, and another baffle tube spacedly surrounding the first mentioned baffle tube, extending upwardly from said bottom member and having a free upper edge over which vapors may flow to the condenser, the annular passage formed between the first mentioned baffle tube and the heater having a smaller cross-sectional area than the annular passage formed between the two baffle tubes.

5. In distillation apparatus of the type which includes an outer vertically extending shell, an annularly arranged condenser element within the shell, and a central evaporation heater within the condenser element and annularly spaced therefrom; the combination of means for passing raw liquid through the condenser and thence upwardly through the evaporation heater, an inner tubular baffle spacedly surrounding the heater, having a closed upper end and an open lower end and enclosing an annular passage for downward flow of fluids around the heater, an outer tubular baffle spacedly surrounding the inner baffle, and annularly spaced inwardly from the condenser element, having an open upper end and a closed lower end which is spaced below the lower open end of the inner baffle, said outer baffle enclosing an annular passage through which fluids travel upwardly after emergence from the open lower end of the inner baffle, the open upper end of the outer baffle communicating with the upper end of the annular space outside that baffle and adjacent the condenser element, a condensate outlet leading from the lower part of the annular space adjacent the condenser, and a residue liquid outlet leading from the lower part of the annular space enclosed by the outer baffle.

6. Distillation apparatus of the type defined in claim 5, and including an air outlet leading from a point near but spaced above the lower end of the annular space adjacent the condenser.

7. Distillation apparatus of the type defined in claim 5, and including an air outlet leading from a point near but spaced above the lower end of the annular space adjacent the condenser, the residue liquid outlet being provided with a trap and joined beyond its trap with the air outlet.

8. In distillation apparatus of the type which includes an outer vertically extending shell closed at top and bottom, an annularly arranged condenser element within the shell and close to its wall, and a central evaporation heater within the condenser element and annularly spaced therefrom; the combination of means in association with the heater forming an upward heating passage for liquid, an outer shell in association with the heater and over which fluids flow downwardly from the upper end of the heating passage, means for introducing raw liquid to the condenser and thence into the lower end of the heating passage, an inner tubular baffle annularly spaced around the heater shell and having a closed upper end and an open lower end and enclosing an annular passage for downward flow of fluids around the heater shell, an outer tubular baffle spacedly surrounding the inner baffle and annularly spaced inwardly from the condenser element, to form an annular passage for upward flow of fluids around the inner baffle from the lower end of the inner baffle, and to form an annular condensation passage adjacent the condenser element, the upper end of the outer baffle being open and its lower end being closed at a level below the lower open end of the inner baffle, the open upper end of the outer baffle communicating with the upper part of the condensation passage, a condensate outlet leading from the lower end of the condensation passage, a residue liquid outlet leading from the lower end of the annular passage enclosed by the outer baffle at a point below the open lower end of the inner baffle, and an air outlet leading from a point in the condensation passage near to but spaced above its lower end.

9. Distillation apparatus as defined in claim 5, and including a heat insulating jacket around the exterior of the heater to retard the heating of fluids flowing downwardly around the heater inside the inner baffle.

10. Distillation apparatus as defined in claim 8, and including a heat insulating jacket surrounding the heater shell to retard the heating of fluids flowing downwardly around that shell within the inner baffle.

11. Distillation apparatus as defined in claim 5, and in which the annular passage enclosed by the inner baffle around the heater is of smaller cross-sectional area than the annular passage between the inner and outer baffles, so as to cause relatively high velocity of downward fluid flow in the first mentioned passage to the lower end of the inner baffle.

12. Distillation apparatus as defined in claim 8, and in which the annular passage enclosed by the inner baffle around the heater is of smaller cross-sectional area than the annular passage between the inner and outer baffles, so as to cause relatively high velocity of downward fluid flow in the first mentioned passage to the lower end of the inner baffle.

13. In distillation apparatus of the type which includes an outer vertically extending shell closed at top and bottom, an annularly arranged condenser element within the shell and close to its wall, and a central evaporation heater within the condenser element and annularly spaced therefrom; the combination which is characterized by the central heater being of the fluid heated type and having an external shell and a plurality of interior tubes forming an upward heating passage for liquid, means for introducing raw liquid to the condenser and thence into the lower end of the heating passage, an inner tubular baffle annularly spaced around the heater shell and having a closed upper end and an open lower end and enclosing an annular passage for downward flow of fluids around the heater shell, an outer tubular baffle spacedly surrounding the inner baffle and annularly spaced inwardly from the condenser element, to form an annular passage for upward flow of fluids around the inner baffle from the lower end of the inner baffle, and to form an annular condensation passage adjacent the condenser element, the upper end of the outer baffle being open and its lower end being closed at a level below the lower open end of the inner baffle, the open upper end of the outer baffle communicating with the upper part of the condensation passage, a condensate outlet leading from the lower end of the condensation passage, a residue liquid outlet leading from the lower end of the annular passage enclosed by the outer baffle at a point below the open lower end of the inner baffle, and an air outlet leading from a point in the condensation passage near to but spaced above its lower end.

14. In distillation apparatus of the type which includes an outer vertically extending shell closed at top and bottom, an annularly arranged condenser element within the shell and close to its wall, and a central evaporation heater within the condenser element and annularly spaced therefrom; the combination of, an inner tubular wall immediately surrounding the central heater, an inner tubular shell mounted on the closed lower end of the outer shell, said shell extending upwardly in annular spaced relation around the inner heater enclosing wall and having an open upper end, said wall and shell forming between them an upwardly extending passage for fluid around the heater enclosing wall, means for introducing raw liquid to the condenser and thence into the lower end of the heating passage, an inner tubular baffle depending from the closed upper end of the outer shell, said baffle being annularly spaced around the inner tubular shell and having an open lower end spaced above the closed lower end of the outer shell, an outer tubular baffle mounted at its lower end on the closed lower end of the outer shell, said outer baffle projecting upwardly in annular spaced relation around the inner baffle and being annularly spaced within the condenser element and having an open upper end, a condensate outlet leading from the lower end of the space between the outer shell and the outer baffle, a fixed gas outlet leading from the lower part of said last mentioned space, and a residue liquid outlet leading from the lower end of the annular space inside the outer baffle.

HENRY I. LEA.